US008633929B2

(12) United States Patent
Crucs

(10) Patent No.: US 8,633,929 B2
(45) Date of Patent: Jan. 21, 2014

(54) SYSTEM AND METHOD OF RENDERING INTERIOR SURFACES OF 3D VOLUMES TO BE VIEWED FROM AN EXTERNAL VIEWPOINT

(75) Inventor: Kevin M. Crucs, Copley, OH (US)

(73) Assignee: Apteryx, Inc., Akron, OH (US)

( * ) Notice: Subject to any disclaimer, the term of this patent is extended or adjusted under 35 U.S.C. 154(b) by 366 days.

(21) Appl. No.: 12/870,882

(22) Filed: Aug. 30, 2010

(65) Prior Publication Data

US 2012/0050288 A1    Mar. 1, 2012

(51) Int. Cl.
G06T 15/00 (2011.01)
G06T 17/00 (2006.01)
G06T 15/40 (2011.01)
G06T 15/10 (2011.01)
G06T 15/20 (2011.01)

(52) U.S. Cl.
USPC ........... 345/427; 345/419; 345/420; 345/421; 345/424

(58) Field of Classification Search
USPC ........................ 345/418–424, 427; 382/277
See application file for complete search history.

(56) References Cited

U.S. PATENT DOCUMENTS

| | | | |
|---|---|---|---|
| 5,644,689 A | 7/1997 | Ban et al. | |
| 5,782,762 A | 7/1998 | Vining | |
| 5,880,735 A * | 3/1999 | Shinohara | 345/419 |
| 5,891,030 A | 4/1999 | Johnson et al. | |
| 6,346,939 B1* | 2/2002 | Isaacs | 345/421 |
| 6,831,639 B2* | 12/2004 | Tanibuchi et al. | 345/419 |
| 7,336,763 B2 | 2/2008 | Spartiotis et al. | |
| 7,466,314 B2 | 12/2008 | Loop et al. | |
| 7,595,798 B2* | 9/2009 | Ben-Shachar et al. | 345/418 |
| 7,676,022 B2 | 3/2010 | Pantsar et al. | |
| 7,737,973 B2* | 6/2010 | Wheeler et al. | 345/426 |
| 2004/0145603 A1* | 7/2004 | Soares | 345/730 |
| 2006/0082596 A1* | 4/2006 | Karlov et al. | 345/629 |
| 2006/0203010 A1* | 9/2006 | Kirchner et al. | 345/629 |
| 2007/0124071 A1* | 5/2007 | Joo et al. | 701/211 |
| 2008/0070212 A1 | 3/2008 | Haberl | |
| 2008/0231632 A1 | 9/2008 | Sulatycke | |
| 2010/0020068 A1* | 1/2010 | House | 345/419 |
| 2011/0202856 A1* | 8/2011 | Handley et al. | 715/764 |
| 2011/0205583 A1* | 8/2011 | Young et al. | 358/1.15 |
| 2013/0127857 A1* | 5/2013 | Carr et al. | 345/423 |

FOREIGN PATENT DOCUMENTS

WO    2006112895 A1    10/2006

OTHER PUBLICATIONS

Harris, Kevin R., The Absolute Beginner's Guide to Direct3D—Chapter 05: 3D Primitives and Vertex Buffers, 2003.*

* cited by examiner

*Primary Examiner* — Aaron M Richer
*Assistant Examiner* — Michael J Cobb
(74) *Attorney, Agent, or Firm* — Hahn Loeser & Parks, LLP

(57) ABSTRACT

System and methods for rendering interior surfaces of a 3D volumetric object to be viewed from an external viewpoint. Image data sets being representative of a 3D volumetric object are processed to render image surfaces of the 3D volumetric object. The rendered image surfaces are transformed to allow viewing of internal surfaces of the 3D volumetric object from the perspective of the external viewpoint. The transformations involve inverting at least one of a normal vector, a winding order, and a z-order of a plurality of polygon members making up the rendered image surfaces. The transformations may further involve modifying a transparency parameter of a subset of the plurality of polygon members.

16 Claims, 12 Drawing Sheets

INVERTED NORMAL/INVERTED Z-ORDER RENDERING WITH TRANSPARENCY BASED ON NORMAL & Z-ORDER

S1 is invisible: N pointing away from viewpoint
S2 is visible thru ghost of S4: N pointing toward viewpoint, S4 transparent
S3 is invisible: N pointing away from viewpoint
S4 is transparent (ghosted): N pointing toward viewpoint, lower Z-order

INVERTED NORMAL RENDERING WITH TRANSPARENCY BASED ON NORMAL & Z-ORDER

S1 is invisible: N pointing away from viewpoint

S2 is transparent (ghosted): N pointing toward viewpoint, lower Z-order

S3 is invisible: N pointing away from viewpoint

S4 is visible thru ghost of S2: N pointing toward viewpoint, S2 transparent

# SYSTEM AND METHOD OF RENDERING INTERIOR SURFACES OF 3D VOLUMES TO BE VIEWED FROM AN EXTERNAL VIEWPOINT

TECHNICAL FIELD

Certain embodiments of the present invention relate to image rendering. More particularly, certain embodiments of the present invention relate to systems and methods for rendering interior surfaces of a 3D volumetric object to be viewed from an external viewpoint.

BACKGROUND

Today, image rendering applications may show a 3D volumetric object as enclosed when viewed externally with respect to the object. If it is desired to, for example, view interior surfaces of a 3D volumetric object, a user may "zoom in" toward the object until the exterior walls blocking the view of the interior surfaces are passed. However, this does not provide an overall view of the interior of the object because of having to have "zoomed in". For example, if the imaged 3D volumetric object is a human skull, it may be desirable to view an interior surface of the skull from a standard viewpoint on the other side of the skull which is external to the skull, without having to "zoom in" across the opposite wall of the skull which would result in limiting the overall view.

Further limitations and disadvantages of conventional, traditional, and proposed approaches will become apparent to one of skill in the art, through comparison of such systems and methods with the present invention as set forth in the remainder of the present application with reference to the drawings.

SUMMARY

An embodiment of the present invention comprises a system for rendering interior surfaces of a 3D volumetric object to be viewed from an external viewpoint. The system includes means for inputting at least one image data set being representative of a 3D volumetric object. The system further includes means for processing the at least one image data set to render a plurality of image surfaces defining the 3D volumetric object with respect to an external viewpoint being spatially external to the 3D volumetric object. Each of the plurality of image surfaces is rendered as a plurality of polygon members. A definition of each of the plurality of polygon members with respect to the external viewpoint includes at least one of a normal vector, a winding order, and a z-order. The system also includes means for transforming the plurality of image surfaces by inverting at least one of the normal vector, the winding order, and the z-order of each of the plurality of polygon members to render visible at least one interior image surface of the 3D volumetric object with respect to the external viewpoint. The system further includes means for displaying the plurality of transformed image surfaces from a perspective of the external viewpoint. The definition of each of the plurality of polygon members with respect to the external viewpoint may further include a transparency parameter. The means for transforming may further include means for modifying the transparency parameter of each of at least a portion of the plurality of polygon members based on at least one of the normal vector, the winding order, and the z-order of each of the at least a portion of the plurality of polygon members.

Another embodiment of the present invention includes a method of rendering interior surfaces of a 3D volumetric object to be viewed from an external viewpoint. The method includes inputting at least one image data set being representative of a 3D volumetric object into a programmable digital computer having at least one processor. The method further includes processing the at least one image data set, using the programmable digital computer, to render a plurality of image surfaces defining the 3D volumetric object with respect to an external viewpoint being spatially external to the 3D volumetric object. Each of the plurality of image surfaces is rendered as a plurality of polygon members. A definition of each of the plurality of polygon members with respect to the external viewpoint includes at least one of a normal vector, a winding order, and a z-order. The method also includes transforming the plurality of image surfaces, using the programmable digital computer, by inverting at least one of the normal vector, the winding order, and the z-order of each of the plurality of polygon members to render visible at least one interior image surface of the 3D volumetric object with respect to the external viewpoint. The method further includes displaying the plurality of transformed image surfaces from a perspective of the external viewpoint on a display device operatively connected to the programmable digital computer. The definition of each of the plurality of polygon members with respect to the external viewpoint may further include a transparency parameter. The transforming step may further include modifying the transparency parameter of each of at least a portion of the plurality of polygon members, using the programmable digital computer, based on at least one of the normal vector, the winding order, and the z-order of each of the at least a portion of the plurality of polygon members.

A further embodiment of the present invention comprises a system for rendering interior surfaces of a 3D volumetric object to be viewed from an external viewpoint. The system includes means for inputting a plurality of rendered image surface data sets being representative of a 3D volumetric object with respect to an external viewpoint being spatially external to the 3D volumetric object. Each of the plurality of image surface data sets has been rendered as a plurality of polygon members. A definition of each of the plurality of polygon members with respect to the external viewpoint includes at least one of a normal vector, a winding order, and a z-order. The system further includes means for transforming the plurality of image surface data sets by inverting at least one of the normal vector, the winding order, and the z-order of each of the plurality of polygon members to render visible at least one interior image surface of the 3D volumetric object with respect to the external viewpoint. The system also includes means for displaying the plurality of transformed image surface data sets from a perspective of the external viewpoint. The definition of each of the plurality of polygon members with respect to the external viewpoint may further include a transparency parameter. The means for transforming may further include means for modifying the transparency parameter of each of at least a portion of the plurality of polygon members based on at least one of the normal vector, the winding order, and the z-order of each of the at least a portion of the plurality of polygon members.

Another embodiment of the present invention comprises a method of rendering interior surfaces of a 3D volumetric object to be viewed from an external viewpoint. The method includes inputting a plurality of rendered image surface data sets being representative of a 3D volumetric object with respect to an external viewpoint being spatially external to the 3D volumetric object into a programmable digital computer having at least one processor. Each of the plurality of image surface data sets had been rendered as a plurality of polygon members. A definition of each of the plurality of polygon members with respect to the external viewpoint includes at least one of a normal vector, a winding order, and a z-order. The method further includes transforming the plurality of image surface data sets using the programmable digital computer by inverting at least one of the normal vector, the winding order, and the z-order of each of the plurality of polygon members to render visible at least one interior image surface of the 3D volumetric object with respect to the external viewpoint. The method also includes displaying the plurality of transformed image surface data sets from a perspective of the external viewpoint on a display device operatively connected to the programmable digital computer. The definition of each of the plurality of polygon members with respect to the external viewpoint may further include a transparency parameter. The transforming step may further include modifying the transparency parameter of each of at least a portion of the plurality of polygon members, using the programmable digital computer, based on at least one of the normal vector, the winding order, and the z-order of each of the at least a portion of the plurality of polygon members.

A further embodiment of the present invention comprises a method of rendering interior surfaces of a 3D volumetric object to be viewed from an external viewpoint. The method includes inputting at least one image data set being representative of a 3D volumetric object into a programmable digital computer having at least one processor. The method further includes processing the at least one image data set, using the programmable digital computer, to render a near external image surface S1 of the 3D volumetric object, a near internal image surface S2 of the 3D volumetric object, a far internal image surface S3 of the volumetric object, and a far external image surface S4 of the volumetric object with respect to an external viewpoint being spatially external to the 3D volumetric object. Each of the image surfaces S1-S4 is rendered as a plurality of polygon members. A definition of each of the plurality of polygon members with respect to the external viewpoint includes a normal vector and a z-order. The method also includes displaying each of the image surfaces S1-S4 on a display device operatively connected to the programmable digital computer, where the near external surface S1 is visible from a perspective of the external viewpoint. The method further includes transforming the image surfaces S1-S4, using the programmable digital computer, by inverting a normal vector of each of the plurality of polygon members of the image surfaces S1-S4 to form first transformed image surfaces S1'-S4'. The method also includes displaying each of the first transformed image surfaces S1'-S4' on the display device, where the first transformed near internal surface S2' is visible from a perspective of the external viewpoint as a result of the transforming. The method may further include transforming the first transformed image surfaces S1'-S4', using the programmable digital computer, by inverting a z-order of each of the plurality of polygon members of the first transformed image surfaces S1'-S4' to form second transformed image surfaces S1"-S4". The method may also include displaying each of the second transformed image surfaces S1"-S4" on the display device, where the second transformed far external surface S4" is visible from a perspective of the external viewpoint as a result of the transforming.

Another embodiment of the present invention comprises a method of rendering interior surfaces of a 3D volumetric object to be viewed from an external viewpoint. The method includes inputting at least one image data set being representative of a 3D volumetric object into a programmable digital computer having at least one processor. The method further includes processing the at least one image data set, using the programmable digital computer, to render a near external image surface S1 of the 3D volumetric object, a near internal image surface S2 of the 3D volumetric object, a far internal image surface S3 of the volumetric object, and a far external image surface S4 of the volumetric object with respect to an external viewpoint being spatially external to the 3D volumetric object. Each of the image surfaces S1-S4 is rendered as a plurality of polygon members and a definition of each of the plurality of polygon members with respect to the external viewpoint includes a normal vector and a z-order. The method also includes displaying each of the image surfaces S1-S4 on a display device operatively connected to the programmable digital computer, where the near external surface S1 is visible from a perspective of the external viewpoint. The method further includes transforming the image surfaces S1-S4, using the programmable digital computer, by inverting a z-order of each of the plurality of polygon members of the image surfaces S1-S4 to form first transformed image surfaces S1'-S4'. The method also includes displaying each of the first transformed image surfaces S1'-S4' on the display device, where the first transformed far internal surface S3' is visible from a perspective of the external viewpoint as a result of the transforming. The method may further include transforming the first transformed image surfaces S1'-S4', using the programmable digital computer, by inverting a normal vector of each of the plurality of polygon members of the first transformed image surfaces S1'-S4' to form second transformed image surfaces S1"-S4". The method may also include displaying each of the second transformed image surfaces S1"-S4" on the display device, where the second transformed far external surface S4" is visible from a perspective of the external viewpoint as a result of the transforming.

A further embodiment of the present invention comprises a method of rendering interior surfaces of a 3D volumetric object to be viewed from an external viewpoint. The method includes inputting at least one image data set being representative of a 3D volumetric object into a programmable digital computer having at least one processor. The method further includes processing the at least one image data set, using the programmable digital computer, to render a near external image surface S1 of the 3D volumetric object, a near internal image surface S2 of the 3D volumetric object, a far internal image surface S3 of the 3D volumetric object, and a far external image surface S4 of the 3D volumetric object with respect to an external viewpoint being spatially external to the 3D volumetric object. Each of the image surfaces S1-S4 is rendered as a plurality of polygon members, wherein a definition of each of the plurality of polygon members with respect to the external viewpoint includes a winding order and a z-order. The method also includes displaying each of the image surfaces S1-S4 on a display device operatively connected to the programmable digital computer, where the near external surface S1 is visible from a perspective of the external viewpoint. The method further includes transforming the image surfaces S1-S4, using the programmable digital computer, by inverting a winding order of each of the plurality of polygon members of the image surfaces S1-S4 to form first transformed image surfaces S1'-S4'. The method may also include displaying each of the first transformed image surfaces S1'-S4' on the display device, where the first transformed near internal surface S2' is visible from a perspective of the external viewpoint as a result of the transforming. The method may further include transforming the first transformed image surfaces S1'-S4', using the programmable digital computer, by inverting a z-order of each of the plurality of polygon members of the first transformed image surfaces S1'-S4' to form second transformed image surfaces S1"-54". The method may also include displaying each of the second transformed image surfaces S1"-S4" on the display device, where the second transformed far external surface S4" is visible from a perspective of the external viewpoint as a result of the transforming.

Another embodiment of the present invention comprises a method of rendering interior surfaces of a 3D volumetric object to be viewed from an external viewpoint. The method includes inputting at least one image data set being representative of a 3D volumetric object into a programmable digital computer having at least one processor. The method further includes processing the at least one image data set, using the programmable digital computer, to render a near external image surface S1 of the 3D volumetric object, a near internal image surface S2 of the 3D volumetric object, a far internal image surface S3 of the 3D volumetric object, and a far external image surface S4 of the 3D volumetric object with respect to an external viewpoint being spatially external to the 3D volumetric object. Each of the image surfaces S1-S4 is rendered as a plurality of polygon members, wherein a definition of each of the plurality of polygon members with respect to the external viewpoint includes a winding order and a z-order. The method also includes displaying each of the image surfaces S1-S4 on a display device operatively connected to the programmable digital computer, where the near external surface S1 is visible from a perspective of the external viewpoint. The method further includes transforming the image surfaces S1-S4, using the programmable digital computer, by inverting a z-order of each of the plurality of polygon members of the image surfaces S1-S4 to form first transformed image surfaces S1'-S4'. The method also includes displaying each of the first transformed image surfaces S1'-S4' on the display device, where the first transformed far internal surface S3' is visible from a perspective of the external viewpoint as a result of the transforming. The method may further include transforming the first transformed image surfaces S1'-S4', using the programmable digital computer, by inverting a winding order of each of the plurality of polygon members of the first transformed image surfaces S1'-S4' to form second transformed image surfaces S1"-S4". The method may also include displaying each of the second transformed image surfaces S1"-S4" on the display device, where the second transformed far external surface S4" is visible from a perspective of the external viewpoint as a result of the transforming.

These and other advantages and novel features of the present invention, as well as details of illustrated embodiments thereof, will be more fully understood from the following description and drawings.

DETAILED DESCRIPTION

Figure 1:
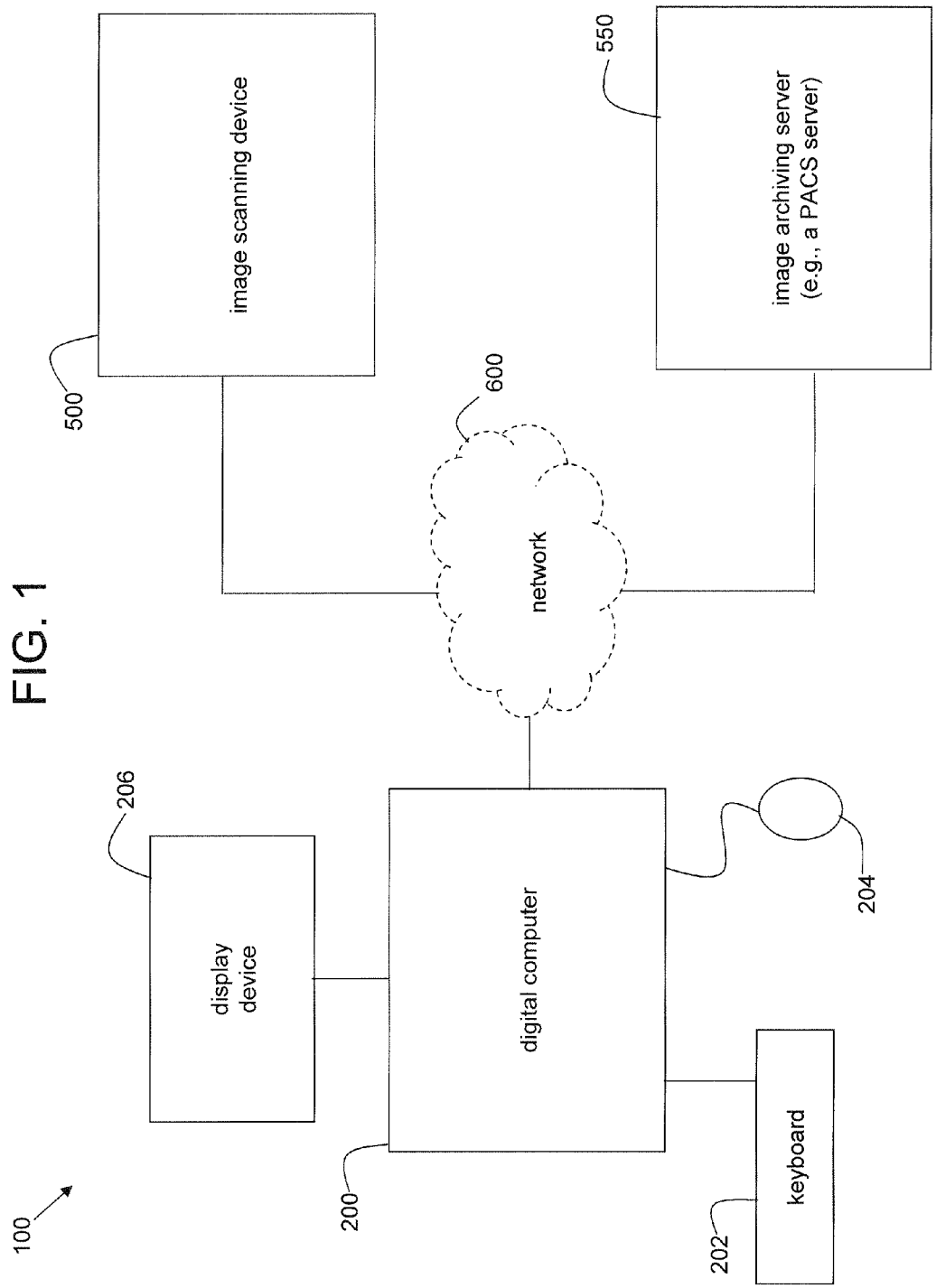
FIG. 1 illustrates a block diagram of a first example embodiment of a system for rendering interior surfaces of a 3D volumetric object to be viewed from an external viewpoint.

FIG. 1 illustrates a block diagram of a first example embodiment of a system 100 for rendering interior surfaces of a 3D volumetric object to be viewed from an external viewpoint 410. The system 100 includes a programmable digital computer 200 operatively connected to a mouse 202 and a keyboard 204, a network infrastructure 600 (optional) for communicating with an image scanning device ("ISD") 500, an image archiving server ("IAS") 550, or both, for transmitting image data to the programmable digital computer 200 for rendering and displaying images on a display device 206 that is operatively connected to the programmable digital computer 200. The network infrastructure 600 may be a local area network, a wide area network, or the internet, for example. The network infrastructure 600 may be a wired network or wireless network. The network infrastructure 600 is optional in that the ISD 500 and/or the IAS 550 may operatively connect directly to the digital computer 200. The ISD 500 may be a medical imaging device such as, for example, a computed tomography (CT) x-ray scanner or an magnetic resonance imaging (MRI) scanner, which are well known in the art, or some other scanning device capable of acquiring and forming image data. The IAS 550 may be a picture archiving and communication systems (PACS) server, for example. Such PACS servers are well known in the art.

The system 100 further include an image rendering subsystem ("IRS") 290 (see FIG. 2) that functionally operates on the programmable digital computer 200 as, for example, software. Alternatively, the system 100 may include a remote server (not shown), which may be accessed by the programmable digital computer 200. Here the remote server may have the IRS 290 installed thereon, and the programmable digital computer 200 may access the remote server to facilitate the operation of the system 100.

Many 3D objects to be rendered as images are often fully enclosed, having an interior region and an exterior region. Such objects include, for example, a human skull and a human colon. The 3D objects may be hollow objects that, when rendered as image surface data, include many polygon representations facing away from and/or toward a defined external viewpoint 410 (see FIG. 4). Conventionally polygons facing away are blocked by polygons facing towards the external viewpoint 410. For example, a near interior surface of a rendered 3D object may face away from the external viewpoint 410 and a near exterior surface may face toward the external viewpoint 410, thus making the near exterior surface visible at the viewpoint 410. A user may have to move the viewpoint 410 inside of the 3D object in order to view the interior surface.

In order to determine which polygons face the external viewpoint 410, normal vectors N or the winding order of the polygons are defined. Conventionally, polygons having normal vectors pointing toward the viewpoint 410 may potentially be seen from that viewpoint 410. However, polygons having normal vectors pointing away from the viewpoint 410 cannot be seen from the viewpoint 410. Winding order (sometimes referred to as winding number) may also be used to define which way a polygon of a rendered surface is facing. The winding order has to do with the order in which the vertices of the polygon are sent to the renderer. A renderer can define either clockwise or counterclockwise winding as front or back facing.

Additionally, the z-order of rendered surfaces defines which surfaces are in front of and behind each other with respect to the viewpoint 410. The z-order values of the rendered surfaces making up the rendered 3D object determine which surface is in front of any other surface with respect to the external viewpoint 410. Conventionally, the surface with the lower z-order value will be the surface closest to and visible from the external viewpoint 410 as long as the normal vectors of that surface are facing towards the external viewpoint 410 (i.e., the surface is defined as facing the viewpoint).

Figure 5:
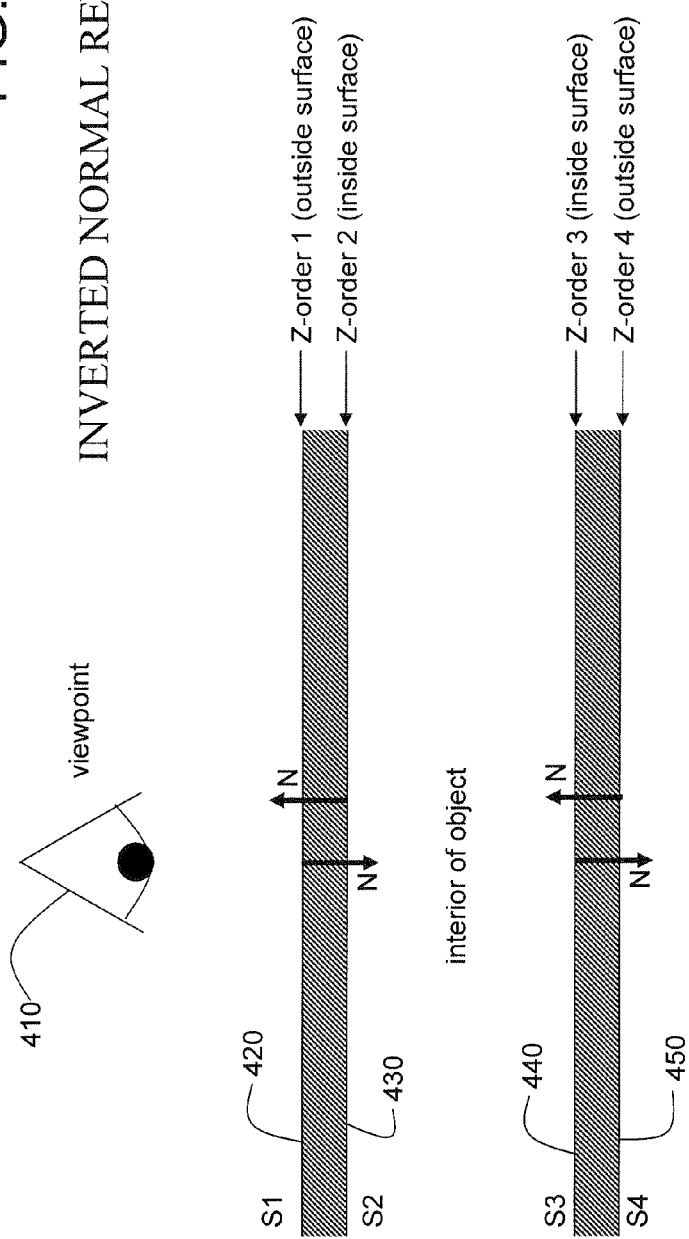
FIG. 5 illustrates an example embodiment of a first process of rendering four surfaces of a 3D volumetric object in accordance with the method of FIG. 3 such that a near internal surface is visible when viewed from an external viewpoint.

In accordance with an embodiment of the present invention, the IRS 290 may be programmed and configured with computer software instructions and hardware instructions (if necessary) to deviate from convention and invert the direction of the normal vectors (or winding order) and/or the z-order for changing the priority of which surfaces are viewed by the external viewpoint 410. Thereafter, the IRS 290 may allow certain exterior and interior surfaces of a rendered hollow 3D volumetric image (e.g., a skull), previously invisible at the viewpoint 410, to be visible to the user without having to move the external viewpoint 410 from the users preferred position. For example, if the user wants to view the interior surface closest to the external viewpoint 410, the user does not have to move the external viewpoint 410 into the skull, but can instead use the IRS 290 to invert the normal vectors of the image thereby causing the closest interior surface to face the external viewpoint 410, and displaying the closest interior surface to the user as is illustrated in FIG. 5.

Figure 2:
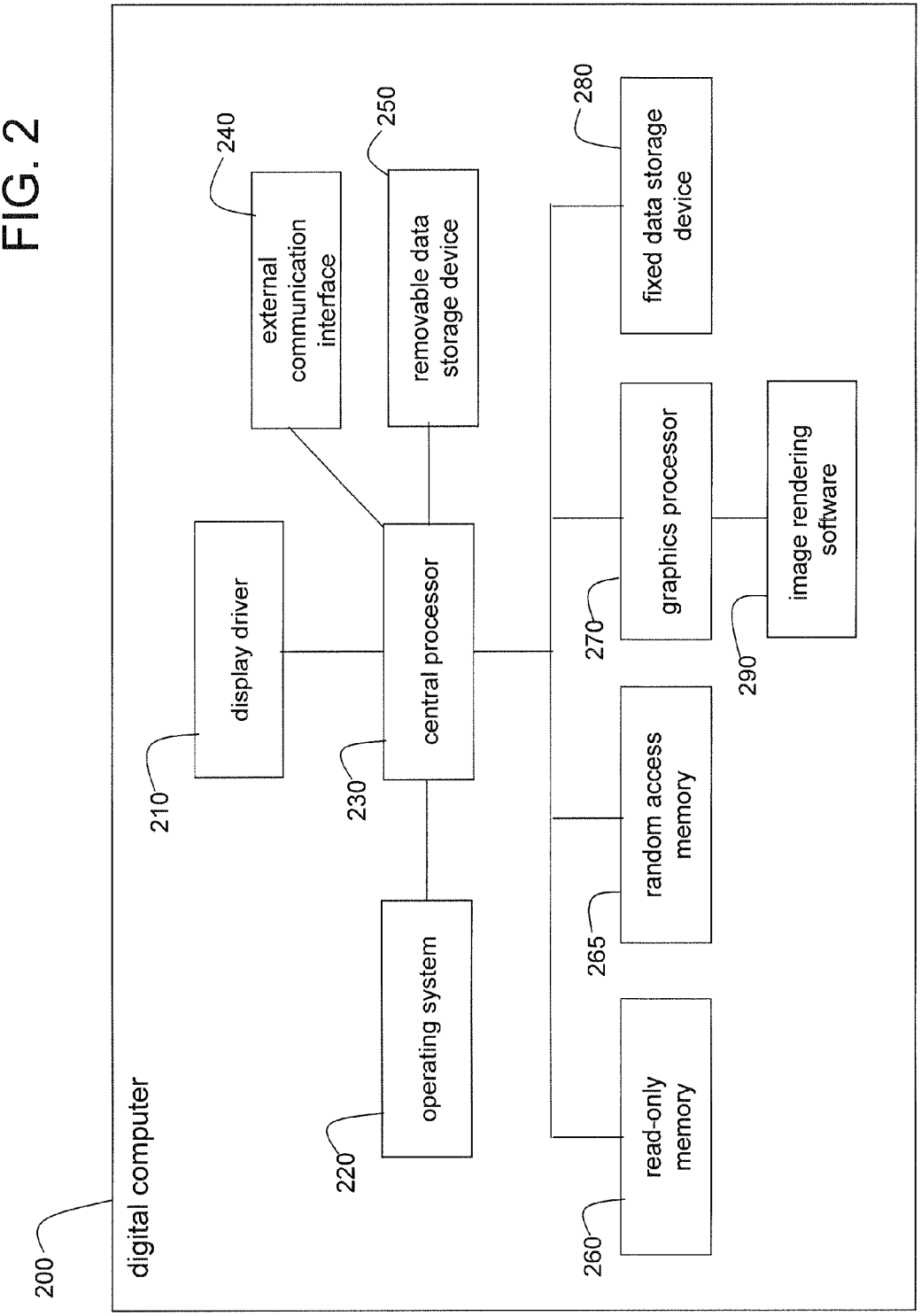
FIG. 2 illustrates a block diagram of an example embodiment of a programmable digital computer of the system of FIG. 1.

With continued reference to FIG. 1, and now FIG. 2, a block diagram of an example embodiment of a programmable digital computer 200 of the system 100 of FIG. 1 is illustrated. The programmable digital computer 200 includes a central processor 230 that operatively communicates with the ISD 500 and/or the IAS 550 via the network infrastructure 600 (or directly) for processing imagery. Alternatively, the programmable digital computer 200 may be integrated into the ISD 500 or IAS 550. The programmable digital computer 200 further includes a display driver 210 for outputting imagery to the display device 206, an operating system 220 operatively running on the central processor 230, an external communication interface 240 that facilitates the communication between the programmable digital computer 200 and the network infrastructure 600, and a removable data storage device 250. The central processor 230 may communicate with a read-only memory ("ROM") 260 and a random access memory ("RAM") 265 to, for example, cache data processed by the operating system 220 and/or the IRS 290.

Additionally, the programmable digital computer 200 further includes a fixed data storage device 280 (e.g., a hard drive) having information related to the operating system 220, the IRS 290 or other system files necessary for the programmable digital computer 200 to be operational. The programmable digital computer 200 further includes a graphics processor 270 on which the IRS 290 runs, in accordance with an embodiment of the present invention. The graphics processor 270 facilitates the processing of image data received from the ISD 500 or the IAS 550 via the central processor 230 for rendering 3D volumetric images. The programmable digital computer 200 may be any standard, commercially available, or customized platform capable of running the IRS 290. For example, the programmable digital computer 200 may be a workstation, a server, or may be internally built-into an imaging device.

Figure 3:
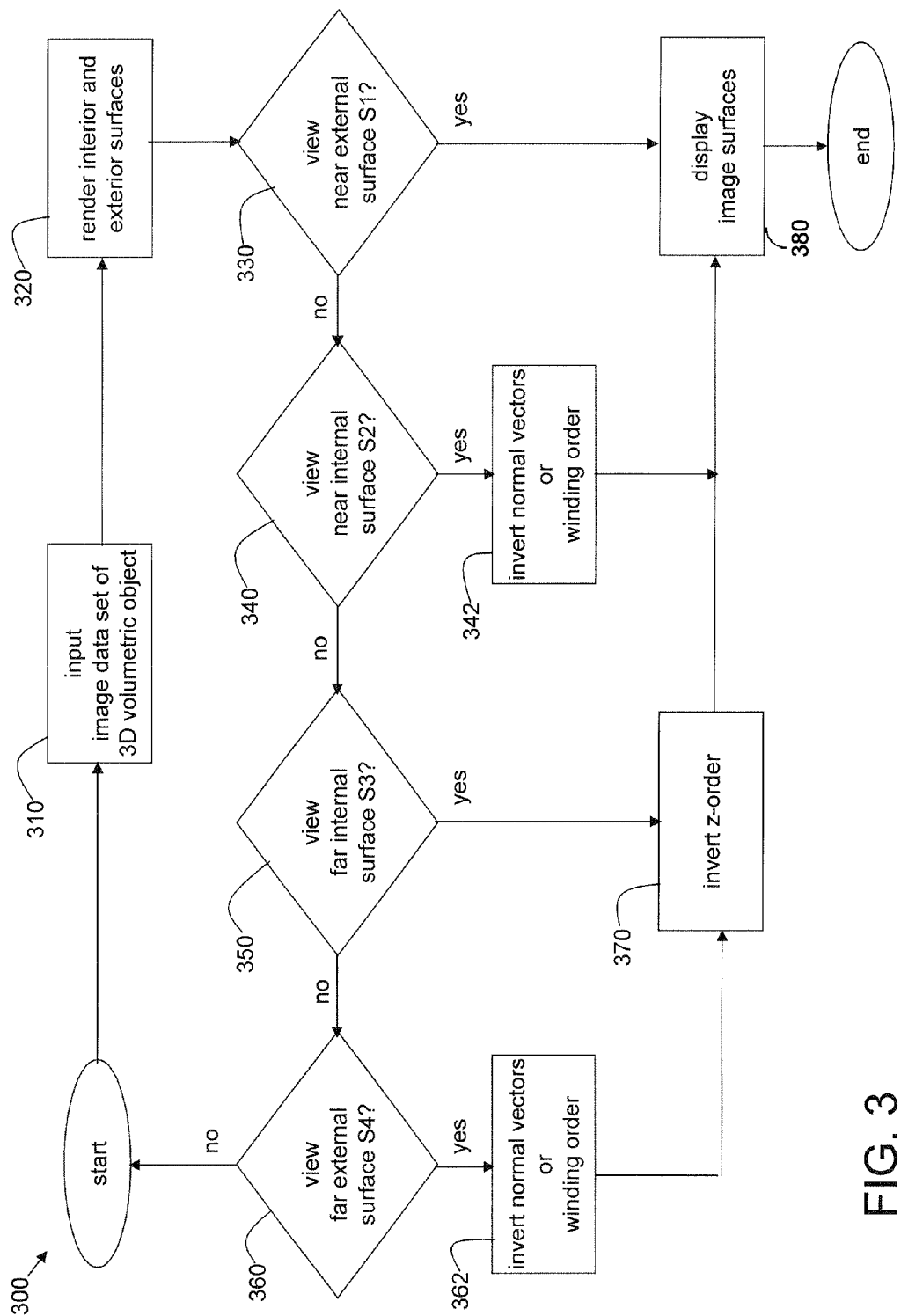
FIG. 3 is a flowchart of a first embodiment of a method of rendering interior surfaces of a 3D volumetric object to be viewed from an external viewpoint using the system of FIG. 1.

FIG. 3 is a flowchart of a first embodiment of a method 300 of rendering interior surfaces of a 3D volumetric object to be viewed from an external viewpoint 410 using the system 100 of FIG. 1. Method 300 includes both decision making steps and processing steps. The method 300 illustrates how rendered image surfaces may be transformed by manipulating the defined parameters of the polygon members making up the rendered surfaces, in accordance with certain embodiments of the present invention. The processing steps, while shown in a particular order in FIG. 3, may be processed in a variety of orders in accordance with other embodiments of the present invention. For example, the z-order may be inverted before or after the normal vectors are inverted without changing the requested image displayed to the user. Additionally, a user may select to view the far exterior surface S4 450 (see FIG. 4) without having to first select "no" for viewing any of the other surfaces.

In step 310 of the method 300, at least one image data set being representative of a 3D volumetric object may be entered into the programmable digital computer 200 for processing by the IRS 290. The image data sets may come from, for example, the ISD 500 or the IAS 550. Thereafter, in step 320, the interior and exterior surfaces of the image data set may be rendered using the IRS 290. The IRS 290 may render a plurality of image surfaces from the image data set, thereby defining a 3D volumetric object with respect to the external viewpoint 410. The plurality of image surfaces may be rendered as a plurality of polygon members that may be transformed (e.g., manipulated or inverted) depending upon the user's decisions. A definition of each of the plurality of polygon members with respect to the external viewpoint includes at least one of a normal vector, a winding order, and a z-order. In explaining the method 300 herein, FIGS. 4-7 are referred to where a 3D volumetric object is rendered which has a near exterior surface S1, a near interior surface S2, a far interior surface S3, and a far exterior surface S4 with respect to an external viewpoint 410.

Figure 4:
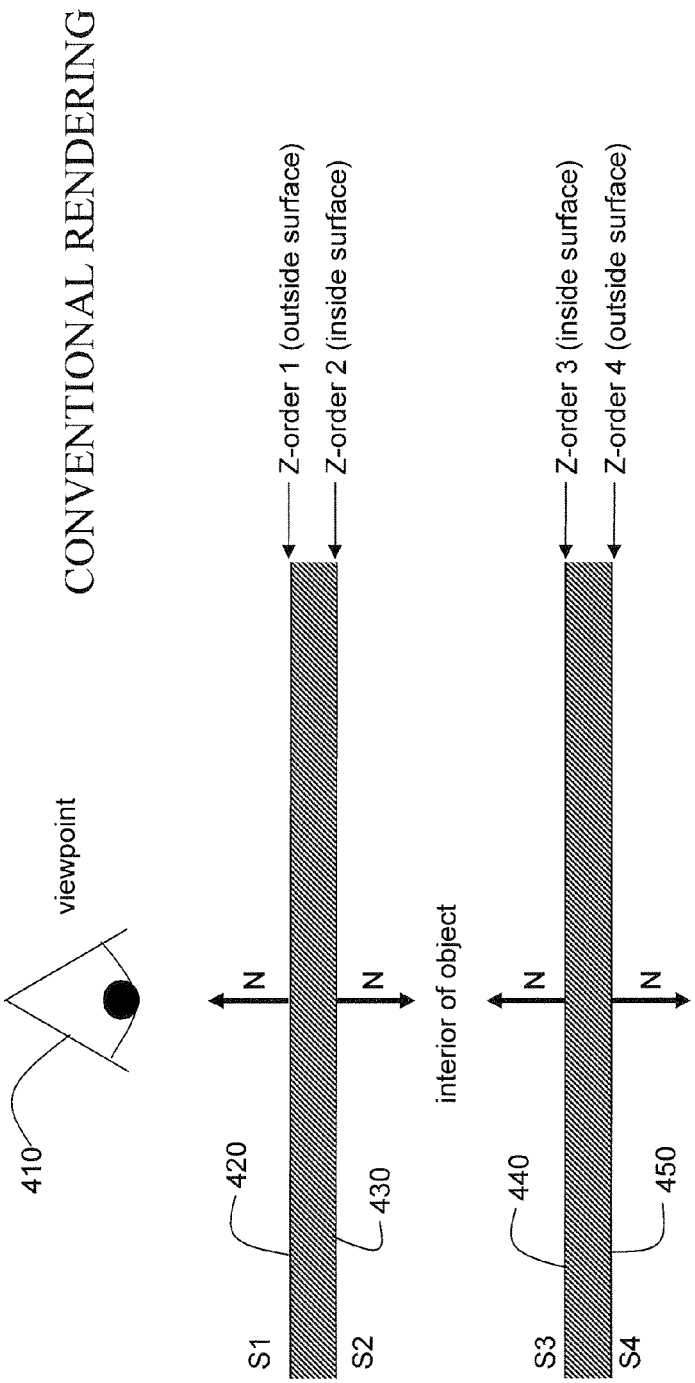
FIG. 4 illustrates an example of a process of rendering four surfaces of a 3D volumetric object in a first conventional manner such that a near external surface is visible when viewed from an external viewpoint.

In step 330 of the method 300, a user, in the decision making process, may select to view a near internal surface S1 420 (see FIG. 4), which is the closest external surface to the external viewpoint 410. Once the user selects this surface S1, in step 380, the near external surface S1 420 may be displayed to the user on the display device 206 (FIG. 1). FIG. 4 illustrates an example embodiment of a process of rendering four surfaces of a 3D volumetric object in a first conventional manner such that a near external surface S1 420 is visible when viewed from an external viewpoint 410. In this process, the surface with the lower z-order value is normally the surface made visible to the external viewpoint 410 so long as the normal vector (or winding order) of that surface defines it as facing toward the external viewpoint 410. Here the near external surface S1 420 is visible because the surface S1 has the lower z-order value compared to the other three surfaces S2-S4. Therefore the surface S1 420 is visible to the external viewpoint 410. The near internal surface S2 430, the far internal surface S3 440, and far external surface S4 450 are not visible to the external viewpoint 410 in this process because the surface S2 430 and the surface S4 450 are defined by their normal vectors (or winding order) as pointing away from the external viewpoint 410, and have a higher z-order value than the surface S1 420. Although the surface S3 440 may be defined as pointing toward the external viewpoint 410 like the surface S1 420, the surface S1 420 blocks the surface S3 440 from the external viewpoint 410 because it has a lower z-order value than the surface S3 440.

The method 300 may further include step 340, where the user, in step 330, has elected not to view the near external surface S1 420, and instead makes the decision to view the near internal surface S2 430 as shown in FIG. 5. At this point, in step 342, the normal vectors N (or winding order) of the surfaces S1-S4 are transformed by inverting (as shown in FIG. 5) such that the near internal surface S2 430 and the far external surface S4 450 are now defined as facing toward the external viewpoint 410, while the near external surface S1 420 and far internal surface S3 440 are now defined as facing away from the external viewpoint 410. The transformed surfaces, having their normal vectors (or winding order) inverted, may be referred to as S1', S2', S3', and S4', for example. Because the z-order value was not inverted, leaving the near internal surface S2 with a lower z-order value than the far external surface S4, the near internal surface S2 430 is displayed to the user on the display device 206 (FIG. 1) in step 380. It shall be appreciated that while the near external surface S1 420 may have the lowest z-order value indicating that it is in front of all of the other surfaces with respect to the viewpoint 410, surface S1 is not displayed since its normal vector N (or winding order) now defines it as facing away from the viewpoint 410 as shown in FIG. 5.

Again, FIG. 5 illustrates an example embodiment of a first process of rendering four surfaces S1-S4 of a 3D volumetric object in accordance with the method 300 of FIG. 3 such that a near internal surface S2 is visible when viewed from an external viewpoint 410. In this process, the IRS 290 on the programmable digital computer 200 is configured to invert the normal vectors (or winding order) of the surfaces such that the near external surface S1 420 and the far internal surface S3 440 are now defined as facing away from the external viewpoint 410, while the near internal surface S2 430 and the far external surface S4 450 are defined as facing toward the external viewpoint 410. In this process, the z-order value may be similar to the z-order value of FIG. 4, where the near external surface S1 420 has a lower z-order value than the near internal surface S2 430, and the surface S2 430 has a lower z-order value than the far internal surface S3 440, and the surface S3 440 has a lower z-order value than the far external surface S4 450. By keeping the default (conventional) z-order value (non-inverted), the near internal surface S2 430 becomes visible to the external viewpoint 410, because like the surface S4 450, the surface S2 430 is defined as facing the external viewpoint 410 by its normal vector (or winding order) However, because the surface S2 430 has a lower z-order value than the surface S4 450, the surface S2 430 blocks the surface S4 450 from the external viewpoint 410, making the surface S2 visible. By utilizing this process, the user may now be able to view the interior surfaces of a hollow 3D object without moving the external viewpoint 410.

Figure 6:
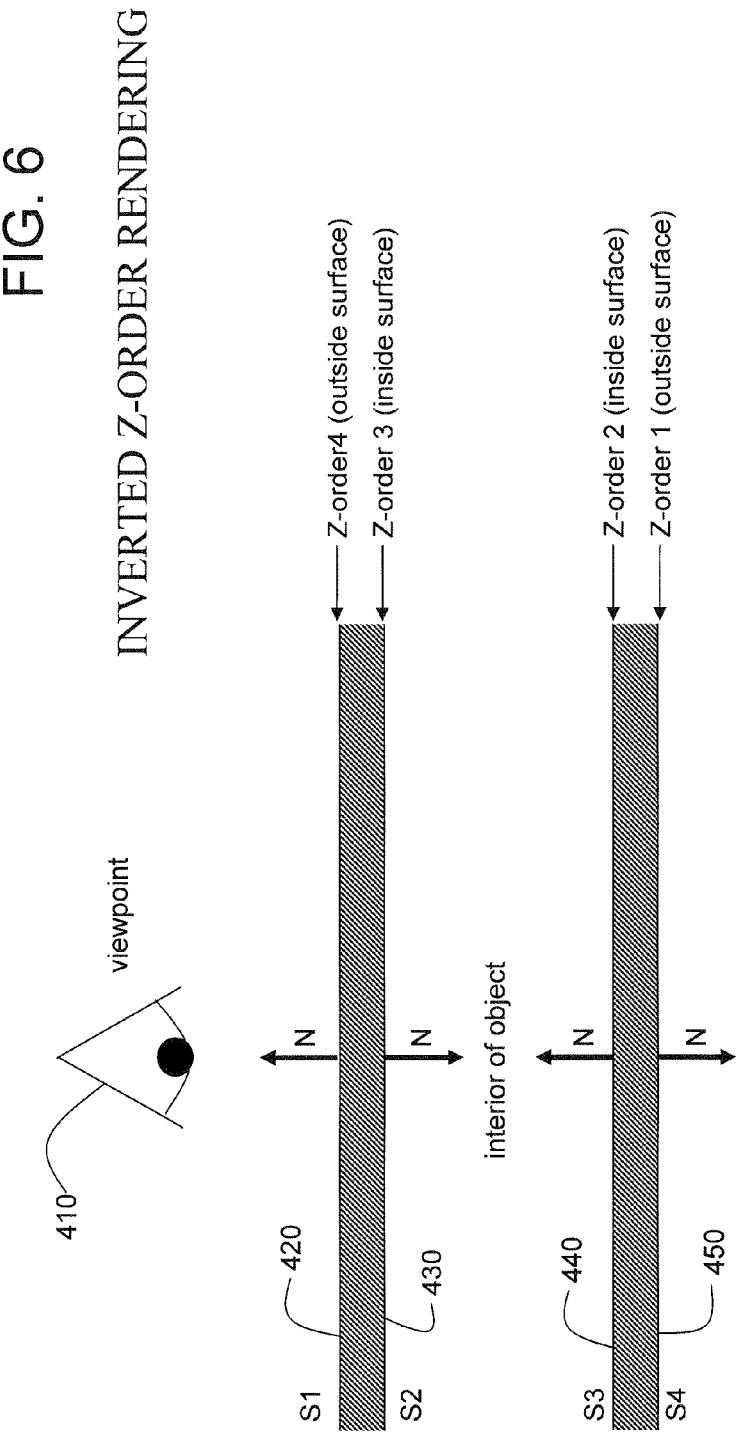
FIG. 6 illustrates an example embodiment of a second process of rendering four surfaces of a 3D volumetric object in accordance with the method of FIG. 3 such that a far internal surface is visible when viewed from an external viewpoint.

The method 300 further includes step 350, when the user elects not to view the near external surface S1 420 or the near internal surface S2 430, but instead selects to view the far internal surface S3 440 as shown in FIG. 6. Then, in step 370, after a user selects to view the far internal surface S3 440, the normal vectors (or winding order) are not inverted, but instead the z-order is inverted. The transformed surfaces, having their z-order inverted, may be referred to as S1', S2', S3', and S4', for example. By inverting the z-order, the far internal surface S3 440, which normally faces toward the external viewpoint 410, becomes visible, and blocks the near external surface S1 420 from the external viewpoint 410 because the far internal surface S3 440 now has a lower z-order value than the near external surface S1 420. Although the near external surface S1 420 also has a normal vector (or winding order) defining it as facing the external viewpoint 410 and, in the real world, is the closer surface to the external viewpoint 410, inverting the z-order gives the far internal surface S3 440 a lower z-order value than the near external surface S1 420, making the far internal surface S3 440 the visible surface to the external viewpoint 410. Thereafter, in step 380, the far internal surface S3 440 may be displayed to the user on the display device 206 (FIG. 1).

Again, FIG. 6 illustrates an example embodiment of a second process of rendering four surfaces S1-S4 of a 3D volumetric object in accordance with the method 300 of FIG. 3 such that a far internal surface S3 is visible when viewed from an external viewpoint 410. In this process, the IRS 290 may be configured to invert the z-order values of the surfaces. In this process, the normal vectors (or winding order) may not be inverted because the default (non-inverted) normal vectors leave the surface S1 420 and the surface S3 440 facing toward the external viewpoint 410, and the surface S2 430 and the surface S4 450 facing away from the external viewpoint 410. Therefore, the surface S1 420 and the surface S3 440 are the two surface capable of being visible to the external viewpoint 410. In this process, the z-order of the surfaces are inverted to provide the surface S4 450 with a lower z-order value than the surface S3 440, the surface S3 440 with a lower z-order value than the surface S2 430, and the surface S2 430 with a lower z-order value than the surface S1 420. By inverting the z-order of the surfaces, the surface that both faces the external viewpoint 410 and has the lower z-order value will be the surface visible to the external viewpoint 410. The far internal surface S3 440 becomes the visible surface in this process. While the surface S1 420 and the surface S3 440 are both facing the external viewpoint 410, the surface S3 440 is visible to the external viewpoint 410 because inverting the z-order provides the surface S3 440 with a lower z-order value that the surface S1 420 making the surface S3 440 the visible surface, blocking the surface S1 420 from the external viewpoint 410.

Figure 7:
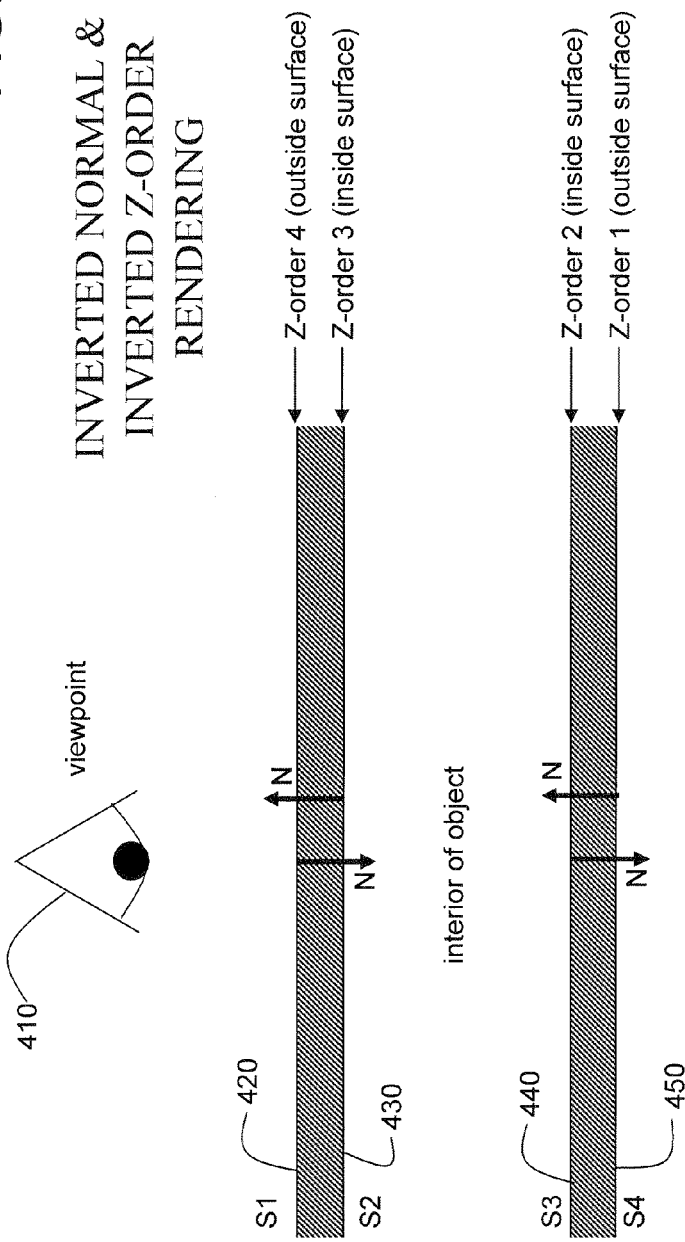
FIG. 7 illustrates an example embodiment of a third process of rendering four surfaces of a 3D volumetric object in accordance with the method of FIG. 3 such that a far external surface is visible when viewed from an external viewpoint.

The method 300 also includes the step 360, where the user elects to view the farthest external surface S4 450 from the external viewpoint 410. As shown in FIG. 7, after selecting the far external surface S4 450, in step 362, the normal vectors (or winding order) are inverted, thereby defining the near internal surface S2 430 and the far external surface S4 450 as facing toward the external viewpoint 410. The transformed surfaces, having their normal vectors (or winding order) inverted, may be referred to as S1', S2', S3', and S4', for example. Next, in step 370, the z-order is inverted, which provides the far external surface S4 450 with a lower z-order value than the near internal surface S2 430, thereby making the far external surface S4 the surface that is visible to the external viewpoint 410 because its normal vector (or winding order) defines it as facing the external viewpoint 410, and because it has a lower z-order value than the near internal surface S2 430. The transformed surfaces, now further having their z-order inverted, may be referred to as S1", S2", S3", and S4", for example. Additionally, the far external surface S4 450, having the lower z-order value than the near internal surface S2 430, blocks the near internal surface S2 430 from being visible, even though the surface S2 is closer to the external viewpoint 410 in the real world. Thereafter, in step 380, the far external surface S4 450 may be visible to user of the display device 206 (FIG. 1).

Again, FIG. 7 illustrates an example embodiment of a third process of rendering four surfaces S1-S4 of a 3D volumetric object in accordance with the method 300 of FIG. 3 such that a far external surface S4 is visible when viewed from an external viewpoint 410. In this process, the IRS 290 on the programmable digital computer 200 may be configured to invert the normal vectors (or winding order) for the surfaces such that the surface S1 420 and the surface S3 440 are now defined as facing away from the external viewpoint 410, while the surface S2 430 and the surface S4 450 are now defined as facing toward the external viewpoint 410. Additionally, the IRS 290 may be configured to invert the z-order of the surfaces, thereby providing the far external surface S4 450 with a lower z-order value than the surface S3 440, and the surface S3 440 with a lower z-order value than the surface S2 430, and the surface S2 430 with a lower z-order value than the surface S1 420. Here, the far external surface S4 450 is visible to the external viewpoint 410 because its normal vector (or winding order) defines it as facing the external viewpoint 410 and the surface S4 450 has a lower z-order value than the surface S2 430. Therefore, the far external surface S4 450 blocks the near internal surface S2 430 from the external viewpoint 410, making the surface S4 450 visible to the external viewpoint 410.

In addition to transforming rendered surfaces by inverting the normal vectors (or the winding order) and the z-order of surface polygons of the rendered surfaces, the effective transparency of a surface may be transformed to allow one surface to be seen as a ghosted image against another surface. The definition of each of the plurality of polygon members making up a rendered image surface of a 3D volumetric object includes a transparency parameter that may be transformed, in accordance with an embodiment of the present invention. FIGS. 8-12 illustrate such techniques, in accordance with various embodiments of the present invention.

Figure 8:
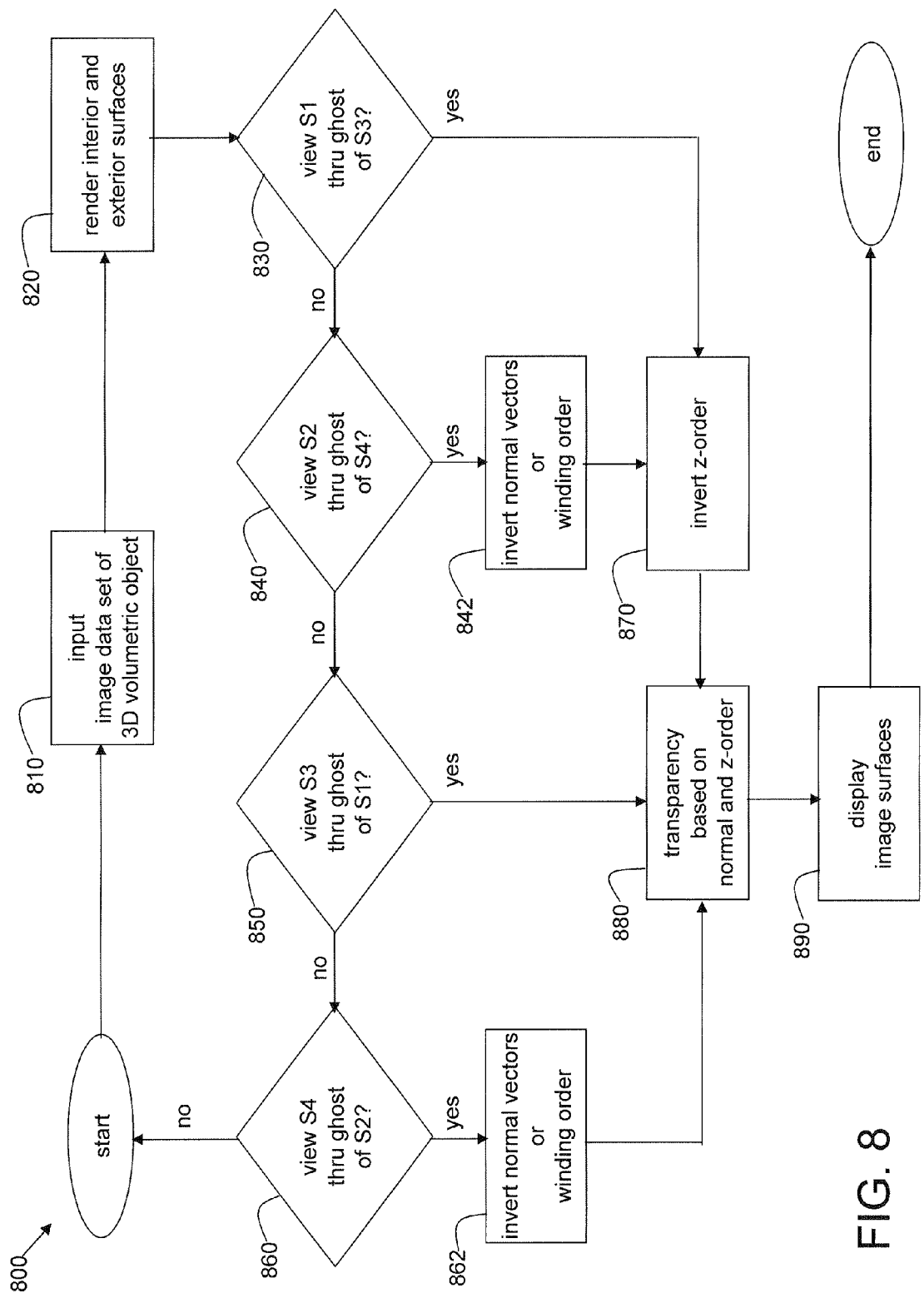
FIG. 8 is a flowchart of a second embodiment of a method of rendering interior surfaces of a 3D volumetric object to be viewed from an external viewpoint using the system of FIG. 1.
Figure 12:
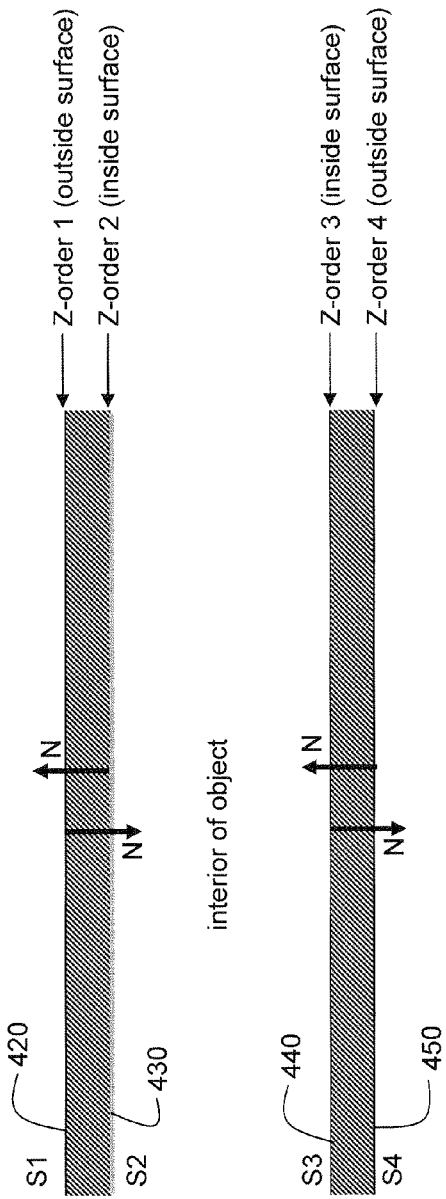
FIG. 12 illustrates an example embodiment of a third process of rendering four surfaces of a 3D volumetric object in accordance with the method of FIG. 8 such that a far external surface is visible when viewed from an external viewpoint.

FIG. 8 is a flowchart of a second embodiment of a method 800 of rendering interior surfaces of a 3D volumetric object to be viewed from an external viewpoint 410 using the system 100 of FIG. 1. The method 800 includes similar decision making steps and processing steps as those in the method 300. The processing steps, while shown in a particular order in FIG. 3, may be processed in a variety of orders in accordance with other embodiments of the present invention. For example, the z-order value may be inverted before or after the normal vector (or winding order) is inverted without changing the requested image displayed to the user. Additionally, a user may select to view the far exterior surface S4 450 through the transparency (ghost) of the near interior surface S2 430 without having to select "no" for viewing any of the other three surfaces as shown in FIG. 12.

In step 810 of the method 800, at least one image data set of a 3D volumetric object may be entered into the programmable digital computer 200 for processing by the IRS 290. The image data sets may come from, for example, the ISD 500 or the IAS 550. Thereafter, in step 820, the interior and exterior surfaces of the image data set may be rendered using the IRS 290. The IRS 290 may define a plurality of image surfaces from the image data set, thereby defining a 3D volumetric object with respect to the external viewpoint 410. The plurality of image surfaces may be rendered as a plurality of polygon members that may be transformed (e.g., manipulated or inverted) depending upon the user's decisions. In explaining the method 800 herein, FIGS. 9-12 are referred to where a 3D volumetric object is rendered which has a near exterior surface S1, a near interior surface S2, a far interior surface S3, and a far exterior surface S4.

Figure 9:
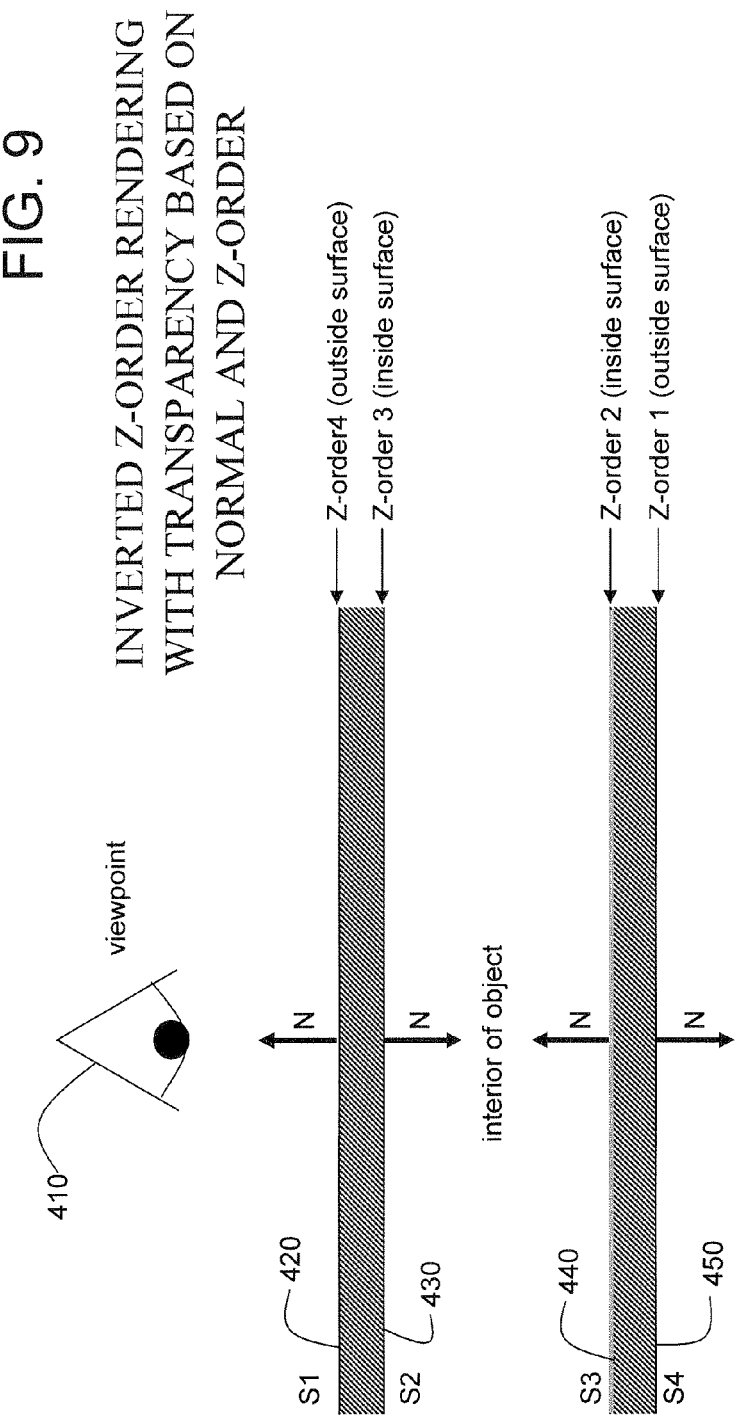
FIG. 9 illustrates an example embodiment of a first process of rendering four surfaces of a 3D volumetric in accordance with the method of FIG. 8 such that a near external surface is visible when viewed from an external viewpoint.

In step 830, a user, during the decision making process, may select whether they want to view the near exterior surface S1 420, which is the closest external surface to the external viewpoint 410, through the ghost or transparency of the far interior surface S3 440 as shown in FIG. 9. After deciding to view the surface S1 420, in step 870, the z-order of the surfaces is inverted providing a lower z-order value to the surface S3 440, thereby making the surface S3 potentially visible. For example, decreasing the visibility percentage of a rendered image surface increases the transparency of the surface, thereby making objects "behind" the surface more visible. Additionally, increasing the visibility percentage decreases the transparency of the surface, thereby making objects "behind" the surface less visible. Thereafter, in step 880, the surface S3 440 is made at least partially transparent, based on the normal vectors (or winding order) and z-order, by changing the transparency parameters of the surface S3, thereby allowing the surface S3 420 to be visible to the external viewpoint 410 through the now at least partially transparent surface S3 440. Since the normal vectors of S1 and S3 point toward the viewpoint 410, and since S3 now has a lower z-order value, S3 is made at least partially transparent. As a result, the surface S3 may still be substantially visible (in a ghosted manner) with the surface S1. Therefore, the surface S1 is viewed from the viewpoint 410 through the ghost of surface S3. This may be useful to a user who desires to see certain features of the surface S3 with respect to the surface S1.

Again, FIG. 9 illustrates an example embodiment of a first process of rendering four surfaces S1-S4 of a 3D volumetric object in accordance with the method 800 of FIG. 8 such that a near external surface S1 420 is visible when viewed from an external viewpoint 410. In this process, the first surface 420 is made visible through the transparency of the third surface 440. The normal vectors (or winding order) are not inverted in this part of the process because the surface S1 420 and the surface S3 440 are already defined as facing the external viewpoint 410 without having to invert the normal vectors (or the winding order). However, the z-order value is inverted for providing the surface S3 440 with a lower z-order value than the surface S1 420, thereby making the surface S3 440 potentially visible to the external viewpoint 410. The surface S3 440 is then made at least partially transparent based on its lower z-order value and its normal vector pointing toward the external viewpoint 410, thereby allowing the surface S1 420 to be visible to the external viewpoint 410 through the now at least partially transparent surface S3 440.

Figure 10:
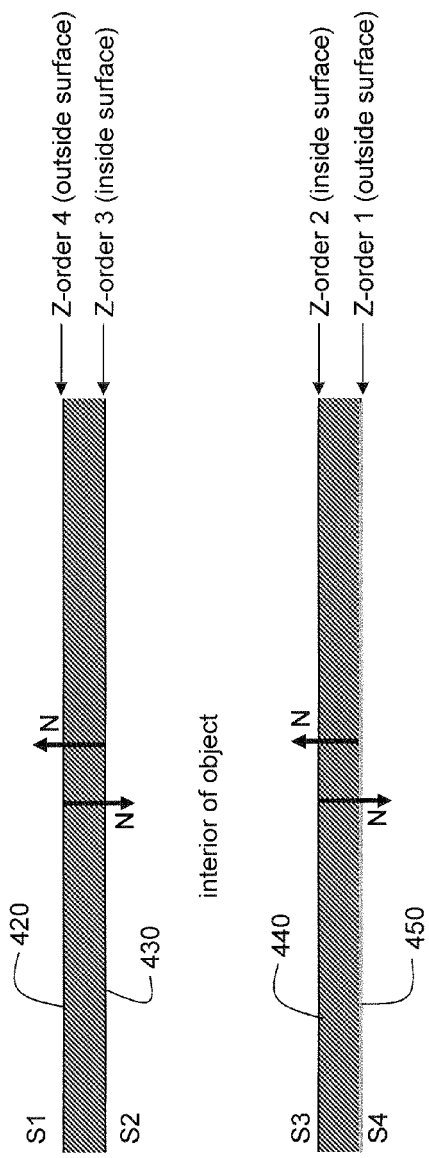
FIG. 10 illustrates an example embodiment of a second process of rendering four surfaces of a 3D volumetric object in accordance with the method of FIG. 8 such that a near internal surface is visible when viewed from an external viewpoint.

The method 800 further includes step 840 where the user decides to view the near interior surface S2 430 through the transparency of the far external surface S4 450 as shown in FIG. 10. Thereafter, in step 842, the normal vectors (or winding order) of the surfaces are inverted such that the surface S2 430 and the surface S4 450 are now defined as facing the external viewpoint 410. Thereafter, in step 870, the z-order is inverted as well to give the surface S4 450 a lower z-order value than the surface S2 430, thereby making the surface S4 450 potentially visible to the external viewpoint 410. Next, in step 880, the surface S4 450 is made at least partially transparent, making the near interior surface S2 430 visible to the external viewpoint 410 through the surface S4 450, and later displayed in step 890 on the display device 206. As a result, the surface S4 may still be substantially visible (in a ghosted manner) with the surface S2. Therefore, the surface S2 is viewed from the viewpoint 410 through the ghost of surface S4. This may be useful to a user who desires to see certain features of the surface S4 with respect to the surface S2.

Again, FIG. 10 illustrates an example embodiment of a second process of rendering four surfaces S1-S4 of a 3D volumetric object in accordance with the method 800 of FIG. 8 such that a near internal surface S2 is visible when viewed from an external viewpoint 410. In this process, the near interior surface S2 430 is visible through the transparency of the far exterior surface S4 450. Here, the IRS 290 on the programmable digital computer 200 inverts the normal vectors (or winding order) of the surfaces so that the surface S2 430 and the surface S4 450 are defined as facing towards the external viewpoint 410. Additionally, the IRS 290 on the programmable digital computer 200 inverts the z-order of the surfaces for providing the surface S4 450 with a lower z-order value than the surface S2 430, thereby making the surface S4 450 potentially visible to the external viewpoint 410, because the surface S4 450 has a normal vector facing the external viewpoint 410, and has a lower z-order value than the surface S2 430. The surface S4 450 may then be made at least partially transparent to the external viewpoint 410, thereby allowing the near interior surface S2 430 to be visible to the external viewpoint 410 through the now at least partially transparent far external surface S4 450.

Figure 11:
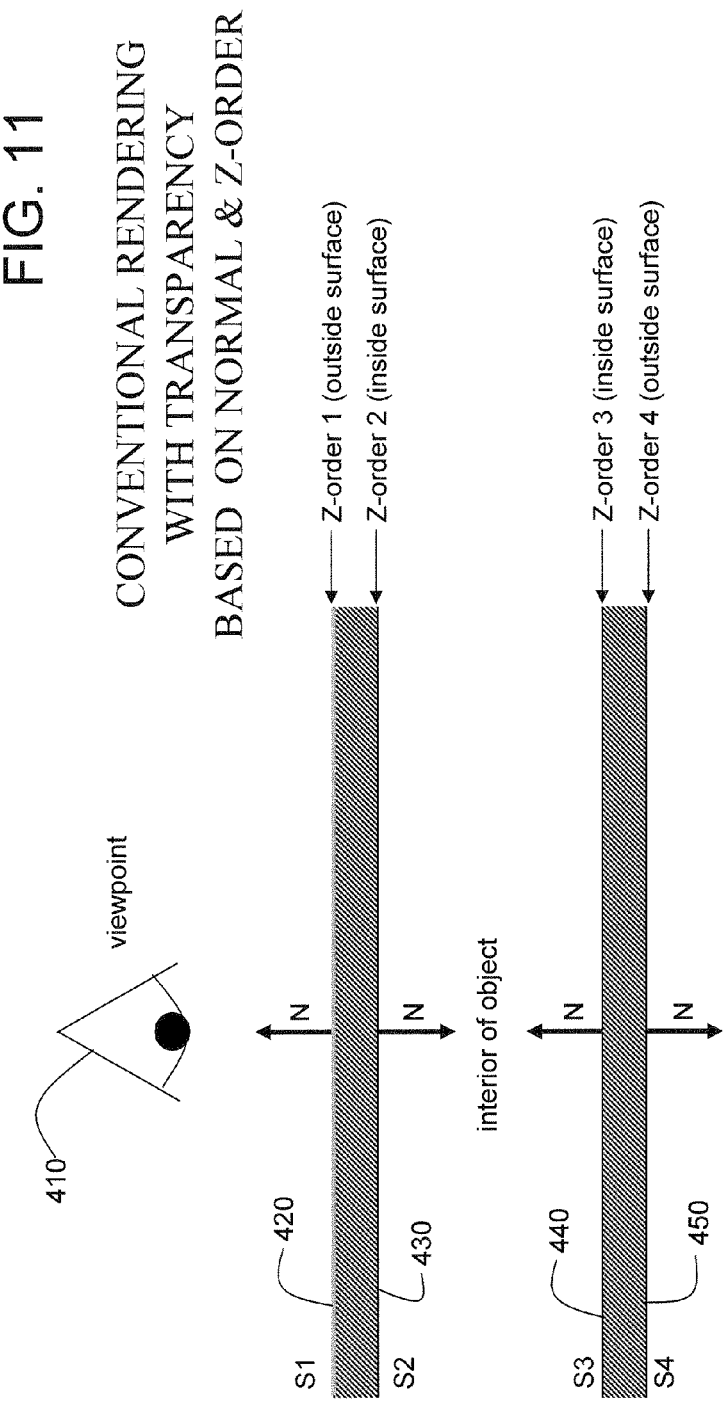
FIG. 11 illustrates an example of a process of rendering four surfaces of a 3D volumetric object in a second conventional manner such that a far internal surface is visible when viewed from an external viewpoint.

The method 800 further includes step 850, where the user decides to view the far interior surface S3 440 through the transparency of the near exterior surface S1 420 as shown in FIG. 11. The need to invert the normal vectors (or winding order) and/or the z-order value is not needed for viewing the far interior surface S3 440 through the transparency of the surface S1 420, because the surface S1 and surface S3 440, without being inverted, have normal vectors facing the external viewpoint 410. Additionally, the conventional, non-inverted z-order provides the surface S1 420 with a lower z-order value than the surface S3 440, thereby making the surface S1 420 potentially visible to the external viewpoint 410. Thereafter, in step 880, the surface S1 420 is made at least partially transparent, based on its lower z-order value and normal vector N pointing toward the viewpoint 410, so that the surface S3 440 is visible to the external viewpoint 410 through the ghosted surface S1, and later displayed in step 890 on the display device 206.

Again, FIG. 11 illustrates an example of a process of rendering four surfaces S1-S4 of a 3D volumetric object in a second conventional manner such that a far internal surface S3 440 is visible when viewed from an external viewpoint 410. In this process, the far interior surface S3 440 is visible through the transparency of the near exterior surface S1 420. The normal vectors (or winding order) and z-order are not inverted in this process because the surface S1 420 and the surface S3 440 normally face the external viewpoint 410 without inverting the normal vectors. Additionally, the z-order, without inverting, provides the surface S1 420 with a lower z-order value than the surface S3 440. Therefore, in this process, the near interior surface S3 440 is visible to the external viewpoint 410, after making the surface S1 420 transparent to the external viewpoint 410 due to its lower z-order value and normal vector N facing the viewpoint 410.

The method 800 also includes the step 860, where the user may decide to view the farthest external surface S4 450 through the transparency of the near internal surface S2 430. Thereafter, in step 862, the normal vectors (or winding order) of the surfaces S1-S4 are inverted such that the surface S2 430 and the far exterior surface S4 450 are defined as facing toward the external viewpoint 410. Thereafter, in step 880, the surface S2 is made at least partially transparent based on its lower z-order value and its normal vector facing the viewpoint 410 so that the far exterior surface S4 450 is no longer blocked by the surface S2 430, and the surface S4 is visible to the external viewpoint 410 through the transparent ghost of the surface S2. The conventional, non-inverted z-order, which provides the surface S2 430 with a lower z-order value than the surface S4 450, is not inverted because making the surface S2 430 transparent allows for the external viewpoint 410 to see the far external surface S4 450 through this transparency. Later, in the step 890, the surface S4 450 may be displayed on the display device 206 to the end user through the transparency of the surface S2 430.

Again, FIG. 12 illustrates an example embodiment of a third process of rendering four surfaces S1-S4 of a 3D volumetric object in accordance with the method 800 of FIG. 8 such that a far external surface S4 is visible when viewed from an external viewpoint 410. In this process, the far external surface S4 450 is visible through the transparency of the near interior surface S2 430. Here, the IRS 290 on the programmable digital computer 200 inverts the normal vectors (or winding order) of the surfaces such that the surface S2 430 and the surface S4 450 are defined as facing toward the external viewpoint 410. The conventional, non-inverted z-order provides the surface S2 430 with a lower z-order value than the surface S4 450, thereby making the surface S2 430 potentially visible to the external viewpoint 410, because the normal vector of the surface S2 430 faces the external viewpoint 410, and it has a lower z-order value than the surface S4 450. However, in this process, the surface S4 450 may then be made visible to the external viewpoint 410, by making the surface S2 430 transparent to the external viewpoint 410 based on its lower z-order value and its normal vector pointing toward the viewpoint 410.

In summary, a system and methods for rendering interior surfaces of a 3D volumetric object to be viewed from an external viewpoint 410 are disclosed. Image data sets being representative of a 3D volumetric object are processed to render image surfaces of the 3D volumetric object. The rendered image surfaces are transformed to allow viewing of internal surfaces of the 3D volumetric object from the perspective of the external viewpoint 410. The transformations involve inverting at least one of a normal vector, a winding order, and a z-order value of a plurality of polygon members making up the rendered image surfaces. The transformations may further involve modifying a transparency parameter of a subset of the plurality of polygon members.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method of rendering interior surfaces of a 3D volumetric object to be viewed from an external viewpoint, said method comprising:

inputting at least one image data set acquired from an external imaging device, the image data set being representative of a 3D volumetric object, into a programmable digital computer having a processor;

processing said at least one image data set, using said programmable digital computer, to render a near external image surface S1 of said 3D volumetric object, a near internal image surface S2 of said 3D volumetric object, a far internal image surface S3 of said volumetric object, and a far external image surface S4 of said volumetric object with respect to an external viewpoint being spatially external to said 3D volumetric object, wherein each of said image surfaces S1-S4 is rendered as a plurality of polygon members, and wherein a definition of each of said plurality of polygon members with respect to said external viewpoint includes a normal vector and a z-order;

displaying each of said image surfaces S1-S4 on a display device operatively connected to said programmable digital computer, where said near external surface S1 is visible from a perspective of said external viewpoint;

transforming said image surfaces S1-S4, using said programmable digital computer, by inverting a normal vector of each of said plurality of polygon members of said image surfaces S1-S4 to form first transformed image surfaces S1'-S4';

displaying each of said first transformed image surfaces S1-S4' on said display device;

transforming said first transformed image surfaces S1'-S4', using said programmable digital computer, by inverting a z-order of each of said plurality of polygon members of said first transformed image surfaces S1-S4' to form second transformed image surfaces S1"-S4"; and displaying each of said second transformed image surfaces S1"-S4" on said display device, where one of said first transformed near internal surface S2' and said second transformed far external surface S4" is visible from a perspective of said external viewpoint.

2. A method of rendering interior surfaces of a 3D volumetric object to be viewed from an external viewpoint, said method comprising:

inputting at least one image data set acquired from an external imaging device, the image data set being representative of a 3D volumetric object, into a programmable digital computer having a processor;

processing said at least one image data set, using said programmable digital computer, to render a near external image surface S1 of said 3D volumetric object, a near internal image surface S2 of said 3D volumetric object, a far internal image surface S3 of said volumetric object, and a far external image surface S4 of said volumetric object with respect to an external viewpoint being spatially external to said 3D volumetric object, wherein each of said image surfaces S1-S4 is rendered as a plurality of polygon members, and wherein a definition of each of said plurality of polygon members with respect to said external viewpoint includes a normal vector and a z-order;

displaying each of said image surfaces S1-S4 on a display device operatively connected to said programmable digital computer, where said near external surface S1 is visible from a perspective of said external viewpoint;

transforming said image surfaces S1-S4, using said programmable digital computer, by inverting a z-order of each of said plurality of polygon members of said image surfaces S1-S4 to form first transformed image surfaces S1'-S4';

displaying each of said first transformed image surfaces S1-S4' on said display device;

transforming said first transformed image surfaces S1'-S4', using said programmable digital computer, by inverting a normal vector of each of said plurality of polygon members of said first transformed image surfaces S1-S4' to form second transformed image surfaces S1"-S4"; and displaying each of said second transformed image surfaces S1"-S4" on said display device, where one of said first transformed far internal surface S3' and said second transformed far external surface S4" is visible from a perspective of said external viewpoint.

3. A method of rendering interior surfaces of a 3D volumetric object to be viewed from an external viewpoint, said method comprising:

inputting at least one image data set acquired from an external imaging device, the image data set being representative of a 3D volumetric object, into a programmable digital computer having a processor;

processing said at least one image data set, using said programmable digital computer, to render a near external image surface S1 of said 3D volumetric object, a near internal image surface S2 of said 3D volumetric object, a far internal image surface S3 of said volumetric object, and a far external image surface S4 of said volumetric object with respect to an external viewpoint being spatially external to said 3D volumetric object, wherein each of said image surfaces S1-S4 is rendered as a plurality of polygon members, and wherein a definition of each of said plurality of polygon members with respect to said external viewpoint includes a winding order and a z-order;

displaying each of said image surfaces S1-S4 on a display device operatively connected to said programmable digital computer, where said near external surface S1 is visible from a perspective of said external viewpoint;

transforming said image surfaces S1-S4, using said programmable digital computer, by inverting a winding order of each of said plurality of polygon members of said image surfaces S1-S4 to form first transformed image surfaces S1'-S4';

displaying each of said first transformed image surfaces S1-S4' on said display device;

transforming said first transformed image surfaces S1'-S4', using said programmable digital computer, by inverting a z-order of each of said plurality of polygon members of said first transformed image surfaces S1-S4' to form second transformed image surfaces S1"-S4"; and displaying each of said second transformed image surfaces S1"-S4" on said display device, where one of said first transformed near internal surface S2' and said second transformed far external surface S4" is visible from a perspective of said external viewpoint.

4. A method of rendering interior surfaces of a 3D volumetric object to be viewed from an external viewpoint, said method comprising:

inputting at least one image data set acquired from an external imaging device, the image data set being representative of a 3D volumetric object, into a programmable digital computer having a processor;

processing said at least one image data set, using said programmable digital computer, to render a near external image surface S1 of said 3D volumetric object, a near internal image surface S2 of said 3D volumetric object, a far internal image surface S3 of said volumetric object, and a far external image surface S4 of said volumetric object with respect to an external viewpoint being spatially external to said 3D volumetric object, wherein each of said image surfaces S1-S4 is rendered as a plurality of polygon members, and wherein a definition of each of said plurality of polygon members with respect to said external viewpoint includes a winding order and a z-order;

displaying each of said image surfaces S1-S4 on a display device operatively connected to said programmable digital computer, where said near external surface S1 is visible from a perspective of said external viewpoint;

transforming said image surfaces S1-S4, using said programmable digital computer, by inverting a z-order of each of said plurality of polygon members of said image surfaces S1-S4 to form first transformed image surfaces S1'-S4'; and displaying each of said first transformed image surfaces S1'-S4' on said display device;

transforming said first transformed image surfaces S1'-S4', using said programmable digital computer, by inverting a winding order of each of said plurality of polygon members of said first transformed image surfaces S1'-S4' to form second transformed image surfaces S1"-S4"; and displaying each of said second transformed image surfaces S1"-S4" on said display device, where one of said first transformed far internal surface S3' and said second transformed far external surface S4" is visible from a perspective of said external viewpoint.

5. A system for rendering interior surfaces of a 3D volumetric object to be viewed from an external viewpoint, said system comprising:

means for inputting at least one image data set acquired from an external imaging device, the image data set being representative of a 3D volumetric object;

means for processing said at least one image data set to render a plurality of image surfaces defining said 3D volumetric object with respect to an external viewpoint being spatially external to said 3D volumetric object, wherein each of said plurality of image surfaces is rendered as a plurality of polygon members, and wherein a definition of each of said plurality of polygon members with respect to said external viewpoint includes at least one of a normal vector, a winding order, and a z-order;

means for displaying each of said plurality of image surfaces, where a near external surface is visible from a perspective of said external viewpoint;

means for transforming said plurality of image surfaces by inverting one of said normal vector, said winding order, and said z-order of each of said plurality of polygon members to form first transformed image surfaces and render visible an interior image surface of said 3D volumetric object with respect to said external viewpoint;

means for displaying said plurality of transformed image surfaces from a perspective of said external viewpoint;

means for transforming said first transformed image surfaces by inverting a different one of said normal vector, said winding order and said z-order of each of said plurality of polygon members of said first transformed image surfaces to form second transformed image surfaces; and means for displaying each of said second transformed image surfaces on said display device, where one of a first transformed internal surface and a second transformed far external surface is visible from a perspective of said external viewpoint.

6. The system of claim 5 wherein said definition of each of said plurality of polygon members with respect to said external viewpoint further includes a transparency parameter.

7. The system of claim 6 wherein said means for transforming further includes means for modifying said transparency parameter of each of at least a portion of said plurality of polygon members based on at least one of said normal vector, said winding order, and said z-order of each of said at least a portion of said plurality of polygon members.

8. A method of rendering interior surfaces of a 3D volumetric object to be viewed from an external viewpoint, said method comprising:

inputting at least one image data set acquired from an external imaging device, the image data set being representative of a 3D volumetric object into a programmable digital computer having a processor;

processing said at least one image data set, using said programmable digital computer, to render a plurality of image surfaces defining said 3D volumetric object with respect to an external viewpoint being spatially external to said 3D volumetric object, wherein each of said plurality of image surfaces is rendered as a plurality of polygon members, and wherein a definition of each of said plurality of polygon members with respect to said external viewpoint includes at least one of a normal vector, a winding order, and a z-order;

displaying each of said plurality of image surfaces, where a near external surface is visible from a perspective of said external viewpoint;

transforming said plurality of image surfaces, using said programmable digital computer, by inverting one of said normal vector, said winding order, and said z-order of each of said plurality of polygon members to form first transformed image surfaces and render visible an interior image surface of said 3D volumetric object with respect to said external viewpoint;

displaying said plurality of transformed image surfaces from a perspective of said external viewpoint on a display device operatively connected to said programmable digital computer;

transforming said first transformed image surfaces, using said programmable digital computer, by inverting a different one of said normal vector, said winding order and said z-order of each of said plurality of polygon members of said first transformed image surfaces to form second transformed image surfaces; and displaying each of said second transformed image surfaces on said display device, where one of a first transformed internal surface and a second transformed far external surface is visible from a perspective of said external viewpoint.

9. The method of claim 8 wherein said definition of each of said plurality of polygon members with respect to said external viewpoint further includes a transparency parameter.

10. The method of claim 9 wherein said transforming further includes modifying said transparency parameter of each of at least a portion of said plurality of polygon members, using said programmable digital computer, based on at least one of said normal vector, said winding order, and said z-order of each of said at least a portion of said plurality of polygon members.

11. A system for rendering interior surfaces of a 3D volumetric object to be viewed from an external viewpoint, said system comprising:
  means for inputting a plurality of rendered image surface data sets being representative of a 3D volumetric object with respect to an external viewpoint being spatially external to said 3D volumetric object, wherein each of said plurality of image surface data sets was rendered as a plurality of polygon members, and wherein a definition of each of said plurality of polygon members with respect to said external viewpoint includes at least one of a normal vector, a winding order, and a z-order;
  means for transforming said plurality of image surface data sets by inverting one of said normal vector, said winding order, and said z-order of each of said plurality of polygon members to form first transformed image surfaces and render visible an interior image surface of said 3D volumetric object with respect to said external viewpoint;
  means for displaying said plurality of transformed image surface data sets from a perspective of said external viewpoint;
  means for transforming said first transformed image surfaces by inverting a different one of said normal vector, said winding order and said z-order of each of said plurality of polygon members of said first transformed image surfaces to form second transformed image surfaces; and
  means for displaying each of said second transformed image surfaces on said display device, where one of a first transformed internal surface and a second transformed far external surface is visible from a perspective of said external viewpoint.

12. The system of claim 11 wherein said definition of each of said plurality of polygon members with respect to said external viewpoint further includes a transparency parameter.

13. The system of claim 12 wherein said means for transforming further includes means for modifying said transparency parameter of each of at least a portion of said plurality of polygon members based on at least one of said normal vector, said winding order, and said z-order of each of said at least a portion of said plurality of polygon members.

14. A method of rendering interior surfaces of a 3D volumetric object to be viewed from an external viewpoint, said method comprising:
  inputting a plurality of rendered image surface data sets being representative of a 3D volumetric object with respect to an external viewpoint being spatially external to said 3D volumetric object into a programmable digital computer having a processor, wherein each of said plurality of image surface data sets was rendered as a plurality of polygon members, and wherein a definition of each of said plurality of polygon members with respect to said external viewpoint includes at least one of a normal vector, a winding order, and a z-order;
  transforming said plurality of image surface data sets using said programmable digital computer by inverting one of said normal vector, said winding order, and said z-order of each of said plurality of polygon members to form first transformed image surfaces and render visible an interior image surface of said 3D volumetric object with respect to said external viewpoint;
  displaying said plurality of transformed image surface data sets from a perspective of said external viewpoint on a display device operatively connected to said programmable digital computer;
  transforming said first transformed image surfaces, using said programmable digital computer, by inverting a different one of said normal vector, said winding order and said z-order of each of said plurality of polygon members of said first transformed image surfaces to form second transformed image surfaces; and
  displaying each of said second transformed image surfaces on said display device, where one of a first transformed internal surface and a second transformed far external surface is visible from a perspective of said external viewpoint.

15. The method of claim 14 wherein said definition of each of said plurality of polygon members with respect to said external viewpoint further includes a transparency parameter.

16. The method of claim 15 wherein said transforming further includes modifying said transparency parameter of each of at least a portion of said plurality of polygon members, using said programmable digital computer, based on at least one of said normal vector, said winding order, and said z-order of each of said at least a portion of said plurality of polygon members.

* * * * *

UNITED STATES PATENT AND TRADEMARK OFFICE
CERTIFICATE OF CORRECTION

PATENT NO. : 8,633,929 B2  Page 1 of 1
APPLICATION NO. : 12/870882
DATED : January 21, 2014
INVENTOR(S) : Kevin M. Crucs It is certified that error appears in the above-identified patent and that said Letters Patent is hereby corrected as shown below:

In the Claims:

Column 15, Line 40: delete "S1-S4'" and insert --S1'-S4'--.

Column 15, Line 44: delete "S1-S4'" and insert --S1'-S4'--.

Column 16, Line 14: delete "S1-S4'" and insert --S1'-S4'--.

Column 16, Line 18: delete "S1-S4'" and insert --S1'-S4'--.

Column 16, Line 56: delete "S1-S4'" and insert --S1'-S4'--.

Column 16, Line 60: delete "S1-S4'" and insert --S1'-S4'--.

Signed and Sealed this
Fifteenth Day of April, 2014

Michelle K. Lee
*Deputy Director of the United States Patent and Trademark Office*